Feb. 9, 1960     J. F. REUTHER     2,924,726
ALTERNATING CURRENT SYSTEM
Filed Dec. 20, 1956
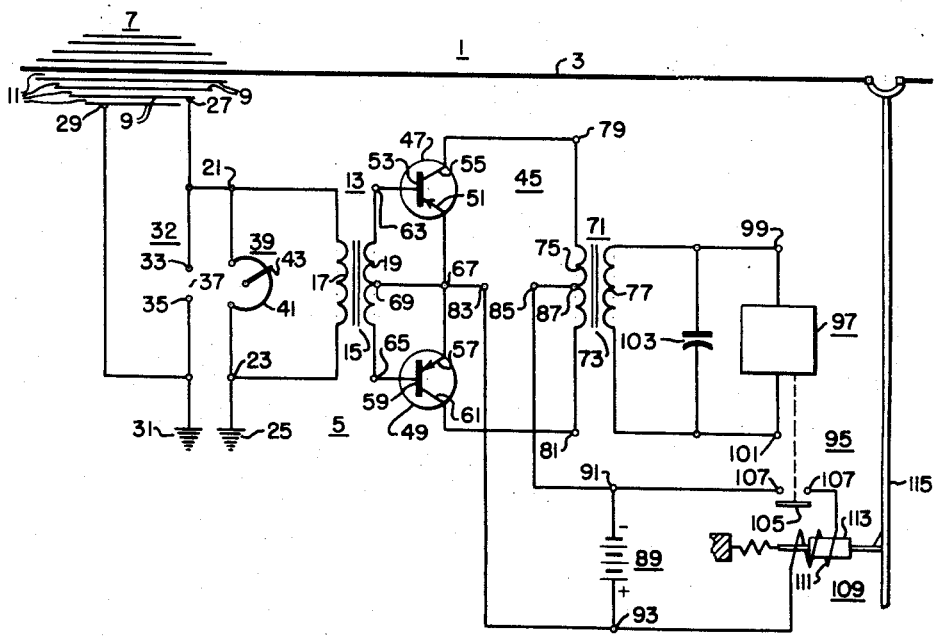
WITNESSES:
INVENTOR
John F. Reuther
BY
ATTORNEY

United States Patent Office 2,924,726
Patented Feb. 9, 1960

2,924,726

ALTERNATING CURRENT SYSTEM

John F. Reuther, Swissvale, Pa., assignor to Westinghouse Electric Corporation, East Pittsburgh, Pa., a corporation of Pennsylvania Application December 20, 1956, Serial No. 629,634

2 Claims. (Cl. 307—109)

This invention relates to alternating current systems and has particular relation to a device for obtaining from a high voltage alternating current circuit a relatively small electrical output quantity which is proportional to the voltage of the circuit.

In high voltage alternating current circuit applications it may be desirable to obtain a relatively small electrical output quantity which is proportional to the voltage of the circuit. This small output quantity may be employed for purposes of energizing translating devices such as protective relays and measuring instruments. In the past, this has been accomplished by utilizing so-called potential devices for obtaining a small voltage from an alternating current circuit. These potential devices are generally connected to a condenser device which may be associated with the circuit for energization from the condenser device. Such a condenser device may comprise either a condenser bushing for insulating a conductor of the circuit or a coupling capacitor for introducing currents to the circuit.

Potential devices heretofore employed have included a step down voltage transformer with a primary winding connected between one of the conductive foils of the condenser device and a ground connection for the condenser device. With this connection, the primary winding is energized by the voltage appearing across a portion of the capacity of the condenser device to produce a small secondary voltage which is proportional to the voltage of the circuit conductor. A suitable translator is connected across the transformer secondary winding. With this type of potential device it has been observed that the primary winding of the voltage transformer may be subjected to energizations on the order of several thousand volts. This presents serious problems with respect to the insulation of the voltage transformer. Furthermore, with this previous arrangement, the entire amount of power necessary to energize the potential device is derived from the associated condenser device.

According to the present invention a device of improved construction is provided for the purpose of obtaining a small electrical output quantity proportional to the voltage of a high voltage alternating current circuit. In the present invention a device is provided which requires energizing voltages which are considerably smaller than the energizing voltages required heretofore in previously designed potential devices. The device is further arranged to deliver sufficient power to an associated translator to effect proper operation of the translator.

In a preferred embodiment of the invention a device is provided which includes a transformer having a pimary winding arranged for connection to a condenser device associated with an alternating current circuit to produce a secondary output current proportional to the circuit voltage. An alternating current amplifier preferably employing a plurality of transistors is connected for energization from the transformer in accordance with the secondary output current for the purpose of amplifying the output current. A suitable translator, such as a relay or measuring instrument, may be connected for energization in accordance with the amplified output current.

Direct current energization of the transistors included in the amplifier may be supplied in any suitable manner. If a protective relay including a circuit breaker device is employed as the translator, the direct current energization for the amplifier may conveniently be supplied by a suitable source of direct current which is employed to energize the circuit breaker device. With the present invention, the magnitude of voltage employed to energize the transformer of the device is observed to be considerably less than the voltages heretofore required. Furthermore, only a portion of the power required to energize the device is obtained from the associated condenser device.

It is, therefore, an object of the invention to provide an improved device for obtaining a relatively small electrical output quantity which is proportional to the voltage of a high voltage alternating current circuit.

It is another object of the invenion to provide a device as defined in the preceding paragraph which is subjected to smaller voltage energizations than heretofore required.

It is still another object of the invention to provide a device which includes a transformer to be connected for energization from a condenser device associated with a high voltage alternating current circuit with an amplifier connected to the transformer for supplying a relatively small electrical output quantity.

It is a further object of the invention to provide an alternating current system having a high voltage circuit with an associated device including an amplifier having a plurality of transistors supplied with direct current energization from a source of direct current employed to energize a circuit breaker which is controlled by the amplified output quantity of the amplifier.

Other objects of the invention will become apparent from the following description taken in conjunction with the accompanying drawing in which the single figure is a schematic representation of an electrical system embodying the teachings of the present invention.

Referring to the drawing there is illustrated in the single figure an alternating current system represented generally by the numeral 1 which includes an alternating current circuit having a portion shown in the form of a conductor 3 for supplying power to suitable load devices (not shown). The invention is particularly advantageous in connection with circuits operating at high voltages, such, for example, as forty-six kilovolts. It will be assumed that the circuit including the conductor 3 operates at a frequency of sixty cycles per second.

In order to obtain a relatively small electrical output quantity which is proportional to voltage of the conductor 3, the present invention provides a device 5 illustrated as connected for energization from a condenser device 7 which is associated with the conductor 3. The condenser device 7 may be in the form of either a condenser bushing employed for the purpose of insulating the conductor 3 or a coupling capacitor provided for the purpose of introducing currents to the conductor 3. For purposes of discussion, it will be assumed that the device 7 is in the form of a condenser bushing having alternate layers of conductive metal foil 9 and insulating material 11 wound about the conductor 3 to provide a series of condenser units. The arrangement is such that a portion of the voltage of the conductor 3 appears across each of the condenser units. Such a condenser bushing device is well-known in the art and need not be described further.

As illustrated, the device 5 includes a transformer 13 conveniently connected for energization from the condenser device 7. The transformer 13 may include a magnetic core 15 with a primary winding 17 and a secondary winding 19 wound thereon in inductive relation. The primary winding 17 includes a pair of input terminals 21 and 23 with the terminal 23 connected to a ground connection 25. In order to permit energization of the transformer 13 the terminal 21 is conveniently connected to one of the electroconductive foils 9 of the device 7 such as shown by the connection 27. The condenser device 7 is grounded by connecting the outer electro-conductive foil 9 to a ground connection 31. The winding 17 is preferably connected across the portion of the total capacity of the device 7 provided by the grounded one of the foils 9 and the adjacent one of the foils 9 for energization in accordance with voltage of the conductor 3.

In order to protect operating personnel against excessive voltages in the event of an open circuit between the terminal 21 and the ground connection 25, a suitable protective device 32 is provided which includes a pair of electrodes 33 and 35 connected in spaced relation to provide a discharge gap 37 across the winding 17. A suitable rheostat 39 is provided which includes a resistance element 41 connected to the terminals 21 and 23 across the winding 17. The rheostat further includes an arm 43 in sliding engagement with the element 41 to permit adjustment of the resistance of the element 41. The rheostat 39 is effective to permit a variation in the amount of current which is supplied to the winding 17.

In order to amplify the current and voltage produced by the transformer 13 the invention provides that the device 5 include an amplifier represented generally by the numeral 45. The amplifier 45 is illustrated in the form of a push-pull amplifier preferably including a pair of similar transistors 47 and 49 illustrated in the form of PNP transistors. The transistor 47 includes an emitter electrode 51, a base electrode 53 and a collector electrode 55. In a similar manner, the transistor 49 includes an emitter electrode 57, a base electrode 59 and a collector electrode 61.

The transistors 47 and 49 are connected for push-pull operation such that they are energized by input voltages having a 180° phase displacement. For this purpose, the base electrodes 53 and 59 are connected respectively to output terminals 63 and 65 of the secondary winding 19 of the transformer 13. The emitter electrodes 51 and 57 are connected together as shown by the connection 67, with the connection 67 connected to a center tap connection 69 of the secondary winding 19.

The amplifier 45 further includes an output transformer 71 including a magnetic core 73 with a primary winding 75 and a secondary winding 77 wound thereon in inductive relation. The primary winding 75 includes a pair of terminals 79 and 81 which are connected respectively to the collector electrode 55 of the transistor 47 and the collector electrode 61 of the transistor 49.

In order to permit direct current energization of the transistors 47 and 49 the amplifier 45 includes a pair of energizable terminals 83 and 85 with the terminal 83 connected to the connection 67 and with the terminal 85 connected to a center tap connection 87 of the primary winding 75. Any suitable source of direct current may be employed for supplying direct current energization to the terminals 83 and 85. As illustrated in the drawing, a source of direct current represented by the battery 89 is provided with a negative terminal 91 connected to the terminal 85 and with a positive terminal 93 connected to the terminal 83. With this arrangement the transistors 47 and 49 are properly energized to effect the desired amplifying function.

In the present invention the input impedance between the terminals 21 and 23 is very small as compared to the impedance between the conductive foils 9 to which the terminals 21 and 23 are effectively connected. Consequently, substantially all of the current flowing from the conductor 3 through the device 7 traverses the primary winding 17 and the rheostat 39 in parallel.

The impedance presented by the device 7 is very large with the result that a very small current flows through the winding 17. This small current is observed to vary in accordance with variations of the voltage of the conductor 3. In a particular application of the invention involving a forty-six kilovolt bushing device the magnitude of this current was observed to be approximately three milliamperes. In addition, the input impedance between the terminals 21 and 23 was observed to be on the order of eight or nine thousand ohms. These values result in a voltage across the terminals 21 and 23 of approximately twenty-five volts. This voltage value is many times smaller than voltage values encountered in potential devices of previous design.

Any suitable translator may be connected for energization from the device 5 in accordance with the output voltage and current from the amplifier 45. For example, a suitable measuring instrument may be connected for energization from the device 5 to provide an indication of the magnitude of voltage of the conductor 3. As illustrated in the drawing a translator represented generally by the numeral 95 is provided which may include a relay device represented by the block 97 connected for energization from the amplifier 45 to control the energization of a suitable system controlling device such as a circuit breaker. The relay device 97 may take any desired form such as a directional overcurrent or overvoltage relay device for controlling operation of the associated circuit breaker. The relay 97 is shown as having a pair of input terminals 99 and 101 which are connected across the secondary winding 77 of the transformer 71 for energization in accordance with voltage across the winding 77. A suitable condenser 103 is shown connected across the terminals 99 and 101 for the purpose of correcting the output load to unity power factor.

The relay 97 is diagrammatically illustrated as including an electroconductive contact bar 105 which is actuable in response to energization of the relay 97 to control the connection of a pair of spaced terminals 107. Energization of the relay 97 may be caused to control the operation of a suitable circuit breaker associated with the conductor 3. For this purpose, a suitable solenoid 109 is provided which includes a winding 111 effective when energized to actuate a magnetic plunger 113. The winding 111 is included in a circuit containing the battery 89 and the spaced terminals 107. Predetermined energization of the relay 97 is effective to actuate the contact bar 105 to bridge the spaced terminals 107 to thereby permit energization of the winding 111 from the battery 89. Such energization results in actuation of the plunger 113 for releasing the circuit breaker 115 to interrupt a connection of the conductor 3.

It is noted that the source of direct current 89 conveniently serves both as a supply of direct current energization for the transistors 47 and 49 of the amplifier 45 and as a source of energization for the solenoid 109 of the translator 95. The arrangement of the device 5 is such that the device 5 requires a small amount of energization from an associated condenser device as compared to the energy requirements of previously designed potential devices. Furthermore, by providing a device which includes a transistor amplifier, sufficient power for operating an associated translator is assured. In addition, the magnitudes of the voltages required to energize the associated input transformer 13 are considerably less than required heretofore. Consequently, the time and expense involved in the insulation of the input transformer are thereby reduced with the result that a device may be constructed which is considerably less expensive than potential devices of previous design. Furthermore, a device constructed in accordance with the present invention requires considerably less space than previously designed potential devices.

Although the invention has been described with reference to certain specific embodiments thereof, numerous modifications are possible and it is desired to cover all modifications falling within the spirit and scope of the invention.

I claim as my invention:

1. In an alternating current system, a power transmission conductor, a condenser device associated with said conductor, a ground connection for said condenser device, said condenser device having a plurality of condenser units connected between said conductor and said ground connection, a transformer having a primary winding connected across the condenser unit adjacent said ground connection, and a secondary winding; said transformer producing when energized at said secondary winding an output quantity substantially proportional to voltage between said conductor and ground connection, transistor amplifier means connected for energization from said secondary winding for amplifying said output quantity, a circuit breaker device for controlling a condition of said system, a source of direct voltage for energizing said breaker device, and a relay device connected for energization in accordance with said amplified output quantity to control the energization of said breaker device from said source of direct voltage, said source of direct voltage being connected to supply direct current energization to said amplifier means, the impedance presented to current traversing said primary winding being substantially less than the impedance of the condenser unit adjacent said ground connection.

2. In an alternating current system, a power transmission conductor, a condenser device associated with said conductor, a ground connection for said condenser device, said condenser device having a plurality of condenser units connected between said conductor and said ground connection, a transformer having a primary winding connected across the condenser unit adjacent said ground connection, and a secondary winding; said transformer producing when energized at said secondary winding an output quantity substantially proportional to voltage between said conductor and ground connection, transistor amplifier means connected to said secondary winding for amplifying said output quantity, and a translating device connected for energization in accordance with said amplified output quantity, the impedance presented to current traversing said primary winding being substantially less than the impedance of the condenser unit adjacent said ground connection.

References Cited in the file of this patent
UNITED STATES PATENTS

| | | |
|---|---|---|
| 1,695,864 | Sessinghaus | Dec. 18, 1928 |
| 1,810,063 | Thomas | June 16, 1931 |
| 1,870,851 | Jones | Aug. 9, 1932 |